United States Patent
Otaki et al.

(10) Patent No.: US 12,516,944 B2
(45) Date of Patent: Jan. 6, 2026

(54) ROUTE SEARCHING DEVICE

(71) Applicant: KABUSHIKI KAISHA TOYOTA CHUO KENKYUSHO, Nagakute (JP)

(72) Inventors: Keisuke Otaki, Nagakute (JP); Tomosuke Maeda, Nagakute (JP); Hiroyuki Sakai, Nagakute (JP); Takayoshi Yoshimura, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 99 days.

(21) Appl. No.: 18/543,540

(22) Filed: Dec. 18, 2023

(65) Prior Publication Data

US 2024/0240950 A1 Jul. 18, 2024

(30) Foreign Application Priority Data

Jan. 18, 2023 (JP) .................................. 2023-005866

(51) Int. Cl.
*G01C 21/34* (2006.01)
*G01C 21/36* (2006.01)

(52) U.S. Cl.
CPC ..... *G01C 21/3461* (2013.01); *G01C 21/3617* (2013.01)

(58) Field of Classification Search
CPC .............. G01C 21/34; G01C 21/3407; G01C 21/3415; G01C 21/3461; G01C 21/3617
See application file for complete search history.

(56) References Cited

U.S. PATENT DOCUMENTS

2018/0283886 A1* 10/2018 Mas-Ud Hussain ........................ G01C 21/3415

FOREIGN PATENT DOCUMENTS

| JP | 2009-204416 A | 9/2009 |
| JP | 2010-237171 A | 10/2010 |
| JP | 2011-209171 A | 10/2011 |
| JP | 2014-44156 A | 3/2014 |
| JP | 2015-180887 A | 10/2015 |

OTHER PUBLICATIONS

Dec. 10, 2024 Office Action issued in Japanese Patent Application No. 2023-005866.

* cited by examiner

*Primary Examiner* — Aaron L Troost
(74) *Attorney, Agent, or Firm* — Oliff PLC

(57) ABSTRACT

A route searching device may obtain map information including a plurality of roads. The route searching device may determine a reference position and a destination on the map information. The route searching device may determine a restricting condition for a mobile body to travel by departing from the reference position and reaching the destination. The route searching device may search a route from the reference position to the destination satisfying the restricting condition. The route searching device may identify a predetermined road from among the plurality of roads. The predetermined road may be a road on which the mobile body has travelled or which has been selected as the route before in the past. The route searching device may search the route such that a percentage at which the identified predetermined road is included in the route becomes low.

14 Claims, 4 Drawing Sheets

ROUTE SEARCHING DEVICE

REFERENCE TO RELATED APPLICATIONS

This application claims priority to Japanese Patent Application No. 2023-005866 filed on Jan. 18, 2023, the entire contents of which are incorporated herein by reference.

BACKGROUND ART

The technology disclosed herein relates to a route searching device that searches for a route to a destination.

There are known technologies for searching a route from a departing point to a destination using a map application on a smartphone. These technologies can present a user with a plurality of route candidates calculated according to general indicators such as a minimum travel distance, minimum travel time, and a minimum number of transits. The user can select one route from among those candidates. For example, JP 2009-204416 A describes a related technique.

DESCRIPTION

In technologies such as the one in JP 2009-204416 A, it is difficult to search for routes that deviate from the shortest route or the fastest route. In such cases, it is impossible to suggest to the user a round-trip activity in which the user visits various points of interest before reaching the destination.

One technique disclosed in the present application is a route searching device. The route searching device may comprise a controller; and a memory storing computer-readable instructions. The computer-readable instructions, when executed by the controller, may cause the route searching device to perform obtaining map information including a plurality of roads. The computer-readable instructions may cause the route searching device to perform determining a reference position and a destination on the map information. The computer-readable instructions may cause the route searching device to perform determining a restricting condition for a mobile body to travel by departing from the reference position and reaching the destination. The restricting condition may include at least one of an upper limit value of time required to reach the destination and an upper limit value of a distance to the destination. The computer-readable instructions may cause the route searching device to perform searching a route from the reference position to the destination satisfying the restricting condition. The searching of the route may include identifying a predetermined road from among the plurality of roads. The predetermined road may be a road on which the mobile body has travelled or which has been selected as the route before in the past. The searching of the route may include searching the route such that a percentage at which the identified predetermined road is included in the route becomes low.

According to the above configuration, the route can be optimized to allow a detour within a certain restricting condition by using past action history and route search history of the mobile body. This enables to prompt the mobile body to deviate off the shortest or fastest route and engage in an excursion activity of visiting various points of interest before reaching the destination.

EMBODIMENTS

Figure 1:
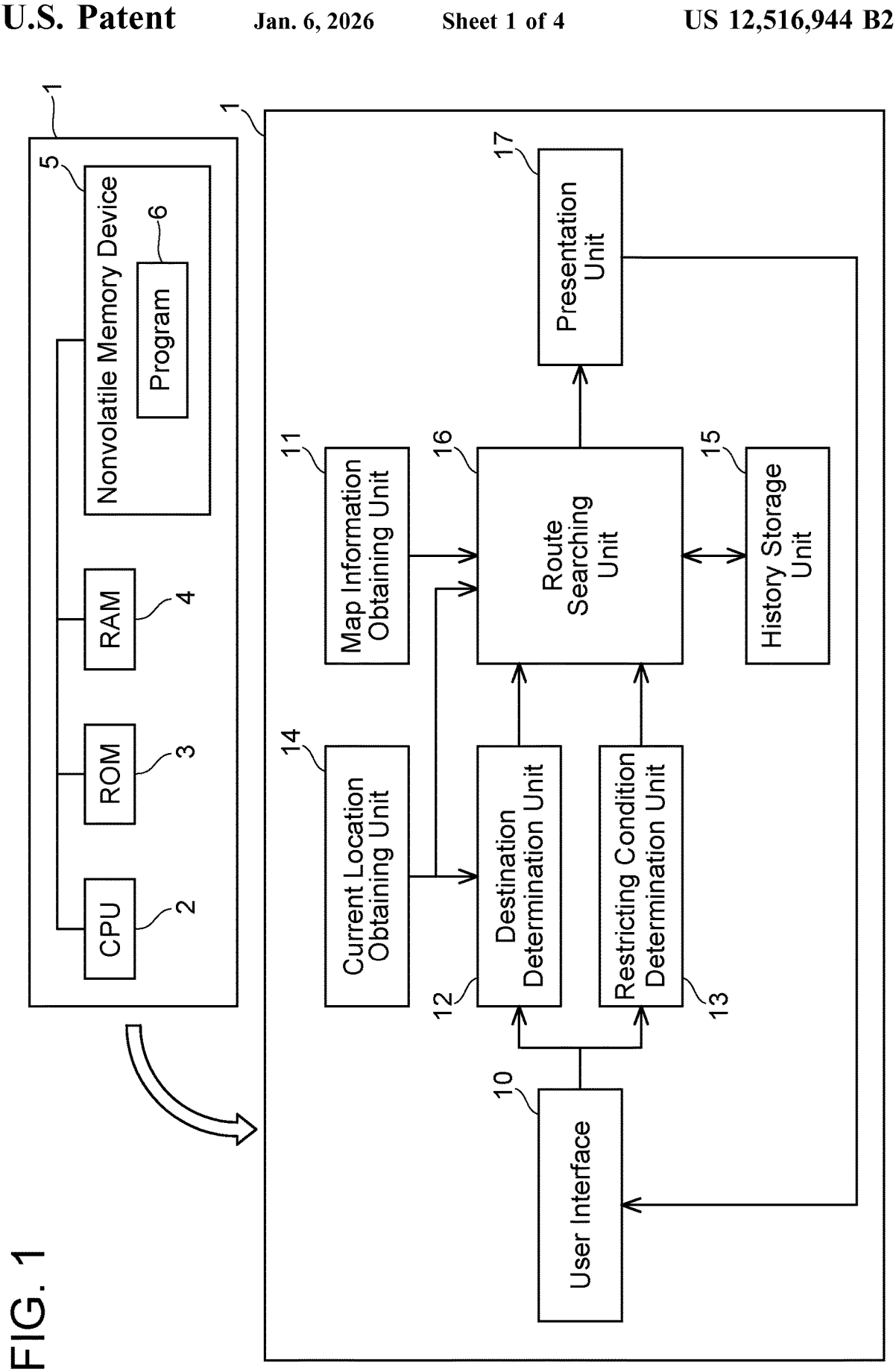
FIG. 1 shows a block diagram of a route searching device 1.

The searching of the route may include searching the route based on an entropy-based evaluation value.

The map information may include a plurality of intersections. The computer-readable instructions, when executed by the controller of the route searching device, may further cause the route searching device to perform storing, for each of the plurality of intersections, a number of visits that accumulated at least one of a number of times the mobile body travelled through the intersection and a number of times the intersection was selected as the route. The searching of the route may include searching the route that reaches the destination via N intersections from the reference position by repeating a process of selecting a $K+1^{th}$ intersection with a $K^{th}$ intersection as a reference over N times. The N may be a natural number greater than or equal to 1 and the K may be a natural number greater than 1 and less than or equal to N−1. The searching of the route may include selecting an intersection with a less number of visits upon selecting the $K+1^{th}$ intersection.

The searching of the route may include selecting the $K+1^{th}$ intersection by heuristic search.

The computer-readable instructions, when executed by the controller of the route searching device, may further cause the route searching device to perform obtaining current location information of the mobile body. The determining of the reference position and the destination may include determining a present reference position based on the current location information. The determining of the restricting condition may include determining remaining time as the restricting condition. The remaining time may be obtained by subtracting elapsed time since the mobile body started to travel toward the destination from the upper limit value of the required time. The searching of the route may include searching the route again such that the destination can be reached within the remaining time.

The computer-readable instructions, when executed by the controller of the route searching device, may further cause the route searching device to perform obtaining current location information of the mobile body. The determining of the reference position and the destination may include determining a present reference position based on the current location information. The determining of the restricting condition may include determining remaining number of waypoints as the restricting condition. The remaining number of waypoints bay be obtained by subtracting number of intersections or roads which the mobile body has travelled through since the mobile body started to travel toward the destination from an upper limit value of routable intersections or roads. The searching of the route may include searching the route again such that the destination can be reached within the remaining number of waypoints.

The computer-readable instructions, when executed by the controller of the route searching device, may further cause the route searching device to perform presenting the route searched by the route searching unit.

The mobile body may comprise a plurality of mobile bodies. The searching of the route may include identifying a road on which one of the plurality of mobile bodies has travelled or which has been selected as the route by one of the plurality of mobile bodies as the predetermined road.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved route searching devices.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment (Configuration of Route Searching Device 1)

FIG. 1 shows a block diagram of a route searching device 1. The route searching device 1 may for example be configured of a PC (abbreviation of Personal Computer), a tablet terminal, or a smartphone equipped with a CPU 2, a ROM 3, a RAM 4, and a nonvolatile storage device 5. The route searching device 1 primarily comprises a user interface 10, a map information obtaining unit 11, a destination determination unit 12, a restricting condition determination unit 13, a current location obtaining unit 14, a history storage unit 15, a route searching unit 16, and a presentation unit 17. The CPU 2 functions as each of the map information obtaining unit 11 through the presentation unit 17, shown in FIG. 1 by the CPU 2 executing the program 6 stored in a nonvolatile memory device 5.

The user interface 10 is a part for receiving various inputs from a user and presenting various types of information to the user. The user interface 10 may be equipped with, for example, a touch panel, a keyboard, a speaker, and a microphone. The user interface 10 may also be equipped with an in-vehicle head-up display or a wearable visual display (e.g., a head-mounted display). The map information obtaining unit 11 is a part for obtaining map information. The map information is data that includes a plurality of roads and a plurality of intersections. The destination determination unit 12 is a part that determines a reference position and a destination on the map information. The reference position is a position that includes various concepts. For example, it can be a departing point or a current location.

The restricting condition determination unit 13 determines a restricting condition for the mobile body to travel from the reference position to the destination. The mobile body is, for example, a user in possession of the route searching device 1 or a vehicle equipped with the route searching device 1. The restricting condition is a position that includes various concepts. For example, the restricting condition may include at least one of the following: an upper limit value of time required to reach the destination, or an upper limit value of a distance to the destination. The distance to destination can include a variety of concepts. For example, it may be a linear distance or a road distance. The distance may be represented by the number of roads connecting between intersections, or the distance may be represented by the number of routed intersections.

The current position obtaining unit 14 is a part that obtains current location information of the mobile body. The current location information may be obtained by GPS, which is provided by the current location obtaining unit 14, or it may be obtained on map information. The history storage unit 15 is a part that stores number of visits for each of the plurality of intersections. The number of visits is obtained by accumulating at least one of the number of times the mobile body has travelled through the intersection and the number of times the intersection was selected as the route. The route searching unit 16 is a part that searches a route from the reference position to the destination satisfying the restricting condition. Specific processing of the route searching unit 16 will be described below. The route presentation unit 17 can present the route searched by the route search part 16 in various ways. For example, a map image may be shown on the display, or it may be an audio guide.

(Search Contents of Route Searching Unit 16)

The route searching unit 16 searches for routes that allow detours within a certain restricting condition. Due to this, it includes a unit configured to evaluate novelty and variation of the generated route. The novelty of a route is a degree at which the route generated this time differs from routes on which the user travelled before or which the user selected from routes generated in the past. The variation in the routes is a degree at which the plurality of routes differs from each other upon generating the plurality of routes.

In this embodiment, the route searching unit 16 evaluates the novelty of the routes and the variation of the routes based on an excursion entropy formula. Here, a network structure (road network) of the map information, which is a target of route search, is denoted by G=(V, E). Here, V denotes the vertex set and E denotes the edge set. Vertices correspond to intersections and edges correspond to roads. A set of n travel routes presented and used in the past is denoted by the following equation. Here, $P_i$ is a sequence of elements of the vertex set V.

$$\mathcal{P} = \{P_1, P_2, \ldots, P_n\}$$

The number of visits to the vertices and edges in the past is calculated and expressed in the formula below.

$$\text{count}(v)(v \in V), \text{count}(e) \ (e \in E)$$

For a vertex, its normalized quantity is calculated as in the following formula. For an edge, its normalized quantity is calculated in the same way.

$$ncount(v) := \text{count}(v) / \sum_v \text{count}(v)$$

An evaluation value based on the excursion entropy when a new route $P_{n+1}$ is presented can be approximated by the following formula. In the entropy formula, it is usual to make a calculated value a positive number by multiplying the entire formula by −1. In the technology described herein, the calculated value can be made a positive number by setting the sign appropriately when the maximization or optimization problem is defined.

$$\sum_{v \in V, count(v) > 0} ncount(v) \log_2 ncount(v)$$

(Example of Specific Calculation Method of Route Searching Unit 16)

The concept of the calculation method used by the route searching unit 16 to search for a route with novelty is explained below. The route searching unit 16 identifies roads on which the mobile body travelled before or that have been selected as a route (predetermined roads) from the plurality of roads included in the map information. The route is then searched so that the percentage of such predetermined roads included in the route is reduced.

The following is an example of a specific calculation method by the route searching unit 16. Prerequisites for the calculation are explained below. Only road network information is used. The restricting condition is set as an upper limit value of the distance to the destination. Specifically, the upper limit value of the distance is set in a rage of a constant multiple of the shortest travel distance (1.3 to 2 times).

To achieve an approximation of the optimization, heuristic search is implemented in this embodiment. In the heuristic search, an evaluation function f (n) is used such that vertices and edges that have been travelled in the past are given a lower priority for the search. Here, we used the following equation (1) as the evaluation function f (n). Here, $f_1$ is the number of vertices travelled through from a start s to a vertex n. $f_2$ is the distance from the vertex n to a goal g. $f_3$ is the number of past visits to the vertex n.

$$f(n) := \alpha \times f_1(s, n) + \beta \times f_2(n, g) + \gamma \times f_3(n) \qquad \text{equation (1)}$$

In this example, a lower calculated value of the evaluation function f(n) means a higher evaluation value (i.e., the novelty and the variation being higher). Therefore, when γ is positive, the larger γ is, the more difficult it is to select vertices with a higher number of visits. As a result, it is possible to search for routes with higher novelty and higher variation.

(Contents of Route Search Process)

Figure 2:
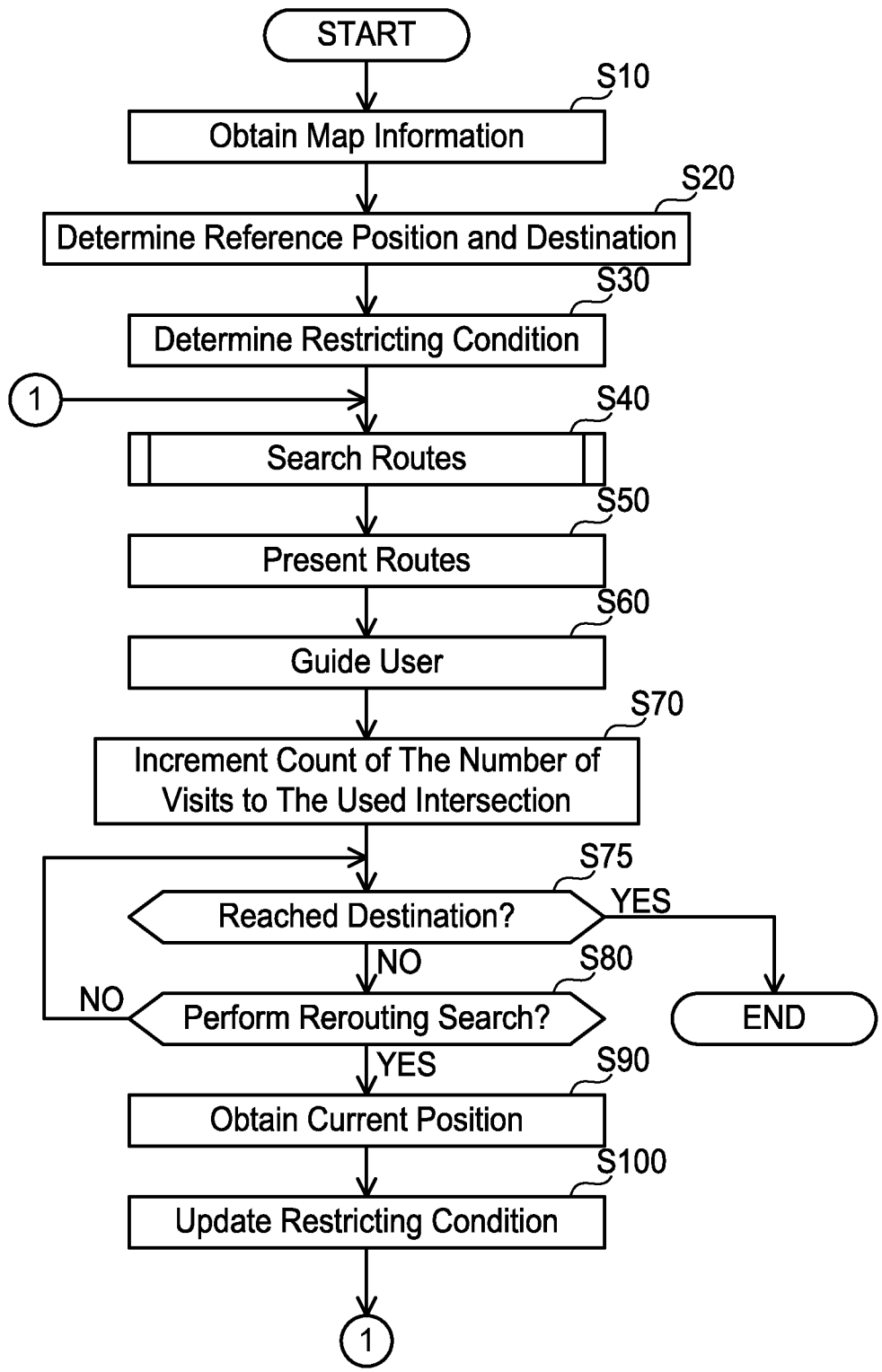
FIG. 2 is a flow chart for explaining a search process.

FIG. 2 describes the search process performed by route searching device 1. The flow in FIG. 2 is initiated when a route search instruction is input to route searching device 1. In step S10, the map information obtaining unit 11 obtains map information. For example, it may be received from an external server by an unshown communication means.

In step S20, the destination determination unit 12 determines the reference position and the destination. Various methods may be employed as methods for determining the reference position and the destination. For example, they may be determined by receiving an input from the user on the user interface 10. In step S30, the restricting condition determination unit 13 determines the restricting condition. Various methods may be employed as a method for determining the restricting condition. For example, it may be determined by accepting input from the user at the user interface 10.

In step S40, the route searching unit 16 searches for a route from the reference position to the destination satisfying the restricting condition. Specifically, a K+1$^{th}$ intersection is selected with reference to a K$^{th}$ intersection based on the heuristic search. In this selection, an intersection with a fewer number of visits is selected with priority. By repeating this selection process over N times, the route from the reference position to the destination via N intersections can be searched. Here, N is a natural number greater than or equal to 1, and K is a natural number greater than 1 and less than or equal to N−1.

Figure 3:
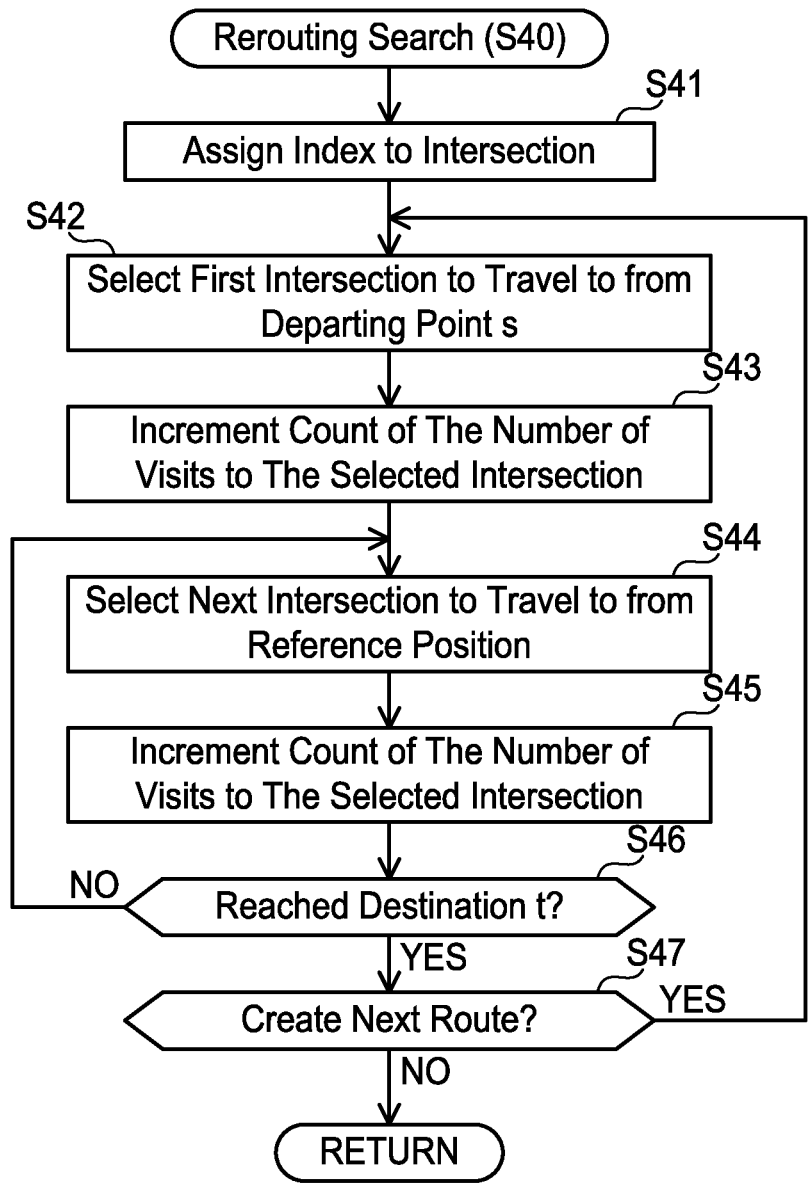
FIG. 3 is a flow chart for explaining specific processing details of step S40.

The specific processing details of step S40 are described using the subroutine in FIG. 3. In step S41, the route searching unit 16 assigns an index to each of the plurality of intersections included in the map information. The index is a series of unique and equal integers that identify each intersection. This step may be omitted if each intersection is pre-indexed.

In step S42, the route searching unit 16 selects the first intersection to travel to from the departing point s. Specifically, the route searching unit 16 picks up all intersections (candidate points) that can be routed. It also reads the number of visits for all candidate points from the history storage unit 15. Next, the evaluation function f(n) is calculated for all candidate points, and the evaluation values are calculated. A candidate point with the best (i.e., smallest) evaluation value is determined as the next reference position. If there are multiple candidate points with the best evaluation values, one of them is selected based on a predetermined rule. In this example, the candidate point with the smallest index is selected as a predetermined rule. In step S43, the history storage unit 15 increments the count of the number of visits to the intersection selected in step S42 by one.

In step S44, the route searching unit 16 selects the next intersection to travel to from the reference position. Since the specific process is the same as that in step S42, the description will be omitted. In step S45, the history storage unit 15 increments the count of the number of visits to the intersection selected in step S44 by one.

In step S46, the route searching unit 16 determines whether or not the destination t has been reached. When a negative judgment is made (S46: NO), the loop process returns to step S44. On the other hand, when a positive judgment is made (S46: YES), it is determined that one route has been completed, and the loop process proceeds to step S47.

In step S47, the route searching unit 16 determines whether or not to create the next route. This determination may be made, for example, based on whether or not a predetermined number of routes have been created. If the decision hereof is affirmative (S47: YES), the search returns to step S42 and the creation of the next route is started. On the other hand, if the decision hereof is negative (S47: NO), it is determined that the route search has been completed, and the process proceeds to step S50 (FIG. 2).

In step S50, the presentation unit 17 presents the searched routes to the user via the user interface 10. At this time, a plurality of routes may be presented and a selection of a route by the user may be accepted. In step S60, the presentation unit 17 guides the user along the route. In step S70, the history storage unit 15 increments the count of the number of visits to the intersection through which the user travelled in the past by one.

In step S75, it is determined whether or not the destination has been reached. If the decision hereof is affirmative (S75: YES), the flow ends, and if the decision hereof is negative (S75: NO), the flow proceeds to S80. In step S80, it is determined whether or not to perform a rerouting search. This determination may be made, for example, in response to elapse of a predetermined period of time since the previous route search. If the decision hereof is negative (S80: NO), the process returns to S75, and if the decision hereof is affirmative (S80: YES), the process proceeds to S90.

In step S90, the current position obtaining unit 14 obtains the current position. The destination determination unit 12 sets the obtained current position as the reference position. In step S100, the restricting condition determination unit 13 updates the restricting condition. Specifically, the remaining time is calculated. The remaining time is obtained by subtracting the elapsed time since the mobile body started to travel toward the destination from the upper limit value of the required time. The remaining time is then determined as the restricting condition. Returning to step S40, the route searching unit 16 searches again for a route to arrive at the destination within the remaining time. Thereafter, a loop process is performed.

(Specific Examples of Search)

Figure 4:
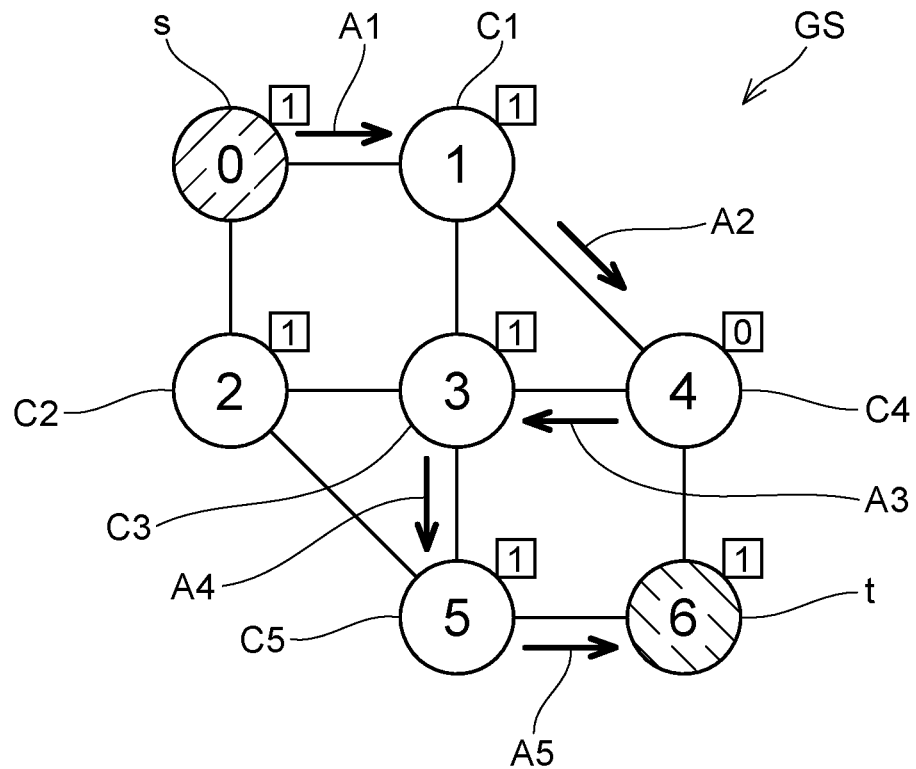
FIG. 4 is a graph structure GS for explaining a specific example of a search.

A specific example of search will be described using a graph structure GS shown in FIG. 4 as an example. In this specific example, a travelling route from a departing point s to a destination point t is searched on the graph structure GS. The evaluation function f(n) shown in Equation (1) is used to explain the case where $\alpha=-1$, $\beta=0$, and $\gamma=1e-12$. Further, a case will also be explained in which, in step S41, "0" is assigned to the departing point s, "1 to 5" are assigned to intersections C1 to C5, and "6" is assigned to the destination t. Further, a case will also be explained in which the restricting condition is a distance to the destination and the content thereof is "the number of roads connecting intersections that can be travelled through is 5 or less".

The case of searching for the first route will be described. The first search is initiated with the departing point s as the reference position. In step S42 (FIG. 3), the numbers of visits to all intersections are read from the history storage unit 15. In this example, the case will described in which the numbers of visits that were read out are "1, 1, 1, 1, 0, 1" respectively for the intersections C1 to C5 in this order. Further, the case will be described in which the numbers of visits to the departing point s and the destination point t are "1, 1" respectively. In FIG. 4, the numbers of visits are shown as numbers enclosed in squares. Intersections that can be routed (i.e., directly connected by roads) are extracted as candidate points. In this example, the candidate points are intersections C1 and C2. Based on Equation (A), the evaluation functions $f(1)=-1+\gamma$ for intersection C1 and $f(2)=-1+\gamma$ for intersection C2 are calculated. Since the evaluation values are equal, intersection C1 with the smaller index is selected (see arrow A1). The number of visits to intersection C1 is then incremented by 1 (step S43, FIG. 5).

A second search is started with the intersection C1 (current location information) as the reference position. The number of routable roads as remaining is four (restricting condition). In step S44, intersections C3 and C4 become candidate points. Then, based on Equation (A), the evaluation functions $f(3)=-2+\gamma$ and $f(4)=-2$, are calculated. The intersection C4 with the smallest evaluation value is selected (see arrow A2). The number of visits to intersection C4 is then incremented by 1 (step S43, FIG. 5).

A third search is started with intersection C4 (current location information) as the reference position. There are only three routable roads remaining (restricting condition). In step S44, the intersection C3 and the destination t become candidate points. Then, based on Equation (A), the evaluation functions $f(3)=-3+\gamma$ and $f(t)=-3+\gamma$, are calculated. Since the evaluation values are equal, intersection C3 with the smaller index is selected (see arrow A3). The number of visits to intersection C3 is then incremented by 1 (step S43, FIG. 5).

A fourth search is started with the intersection C3 (current location information) as the reference position. There are only two roads remaining that can be routed (restricting condition). In step S44, the intersections C2 and C5 become candidate points. However, if the search proceeds to intersection C2, the restricting condition is not satisfied because the number of roads to be travelled to destination t becomes 6 or more. Therefore, the search for the intersection C2 is pruned. As a result, the intersection C5 is selected (see arrow A4). The number of visits to intersection C5 is then incremented by one (step S43, FIG. 5).

Figure 5:
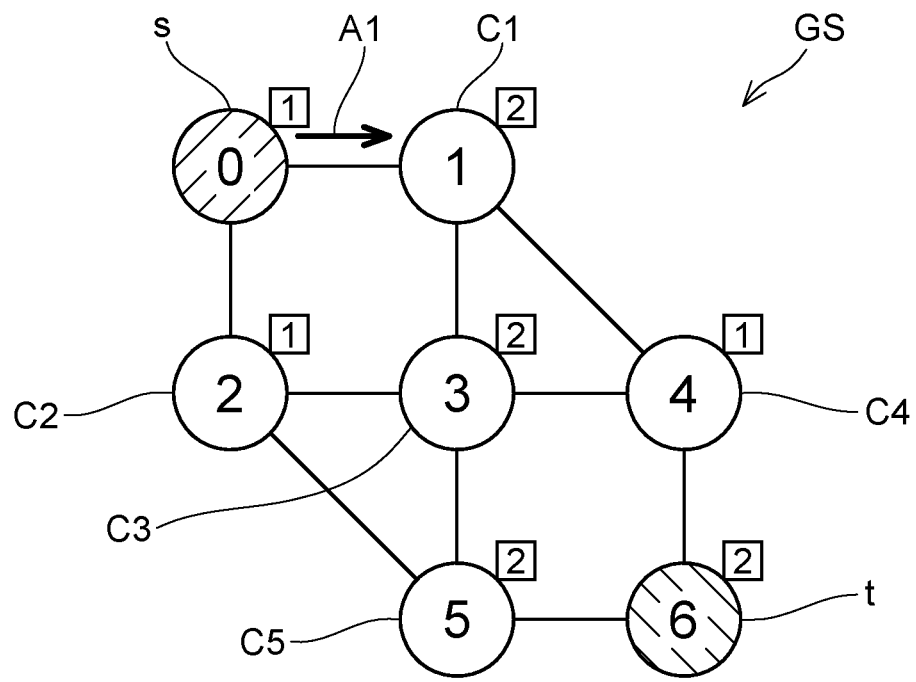
FIG. 5 is a graph structure GS for explaining a specific example of a search.

A fifth search is started with the intersection C5 (current location information) as the reference position. There is only one road remaining that can be routed (restricting condition). In step S44, the intersection C2 and the destination t become candidate points. However, if the search proceeds to the intersection C2, the restricting condition cannot be satisfied, so the search for the intersection C2 is pruned. Therefore, the destination t is selected (see arrow A5). As described above, the first route is generated from the departing point s to reach the destination t via intersections C1, C4, C3, and C5. The number of visits to each intersection is also updated, as shown in FIG. 5.

The second route is generated based on the graph structure GS (FIG. 5), which has been updated with the number of visits during the first route generation. The specific route generation method is the same as that for the first route, so the explanation will be omitted. Thereafter, the above-mentioned route generation process can be repeated to generate the plurality of routes.

In conventional route search techniques, it is difficult to search for routes that deviate off indicators such as the minimum travel distance, the minimum travel time, and the minimum number of transits. On the other hand, the technology described herein can optimize routes to allow detours within the certain restricting condition by using the user's past action history and route search history. This enables to prompt the user to deviate off the shortest route or the fastest route, and to visit various points of interest before reaching the destination. Thus, the system can support the search for a touring travel route in situations where the user is seeking for "exciting travel activities" or wants to "visit locations within a certain area in his/her free time". This can, for example, allow the user to take "excursions in unfamiliar towns that they visit on a trip or during a business trip" or "excursions in towns that they usually visit to gain new insights and experiences," which can have a positive psychological impact on the user.

Example 2

In Example 1, the approximate calculation method for the excursion entropy by the number of vertex visits was explained as an evaluation method for novelty and variation of routes. In Example 2, other evaluation methods will be described.

Background conditions will be described. The graph structure is denoted by $G=(V, E)$. Also, a single route from the departing point s to the destination t is denoted by $P_i$. Specifically, the sequence of passed vertices $P_i=<v_1=s, v_2, v_3, \ldots v_l=t>$ or a sequence of pairs of vertices that were travelled through and the travelling time $P_i$ thereof are used for representation. Further, it is supposed that the K routes used so far have already been calculated as shown in the equation below. Then, when calculating the new K+1$^{th}$ route $P_{K+1}$, the novelty is evaluated.

$$\mathcal{P}_K = \{P_1, P_2, \ldots, P_K\}$$

A first method of evaluating the novelty of routes may be the method of calculating the excursion entropy resulting from a histogram calculation with GPS location information and duration of stay. Since the specific details are known, the explanation will be omitted herefrom.

A second method of evaluating the novelty of routes is to calculate their novelty as a set. For example, the novelty may be determined to be high when the relationship in the following equation is satisfied.

$$\text{As to the route } P_{K+1} \text{ and the set } \mathcal{P}_K, P_{K+1} \notin \mathcal{P}_K$$

A third method of evaluating the novelty of routes may be a calculation based on the evaluation of sets and series similarity: the similarity of route $P_i$ and route $P_j$ as a route may be represented by $\text{sim}_{ij}$. Then, for example, the series similarity may be calculated using the edit distance when the vertex sequence is a string, the longest common sequence, or DTW using latitude and longitude and Euclidean distance. Also, for example, novelty may be evaluated based on the following formula.

$$\text{As the route } P_{K+1} \text{ and the set } \mathcal{P}_K, 1 - \max_k \text{sim}_{k,K+1}$$

While specific embodiments of the present invention have been described in detail above, such description is for illustrative purposes only and is not intended to limit the scope and claims of the invention. Techniques described in the claims of the invention include various modifications and changes made to the specific examples illustrated above.

(Variant)

There may be more than one user. Further, a group may be formed by the plurality of users. In this case, in the concept of the aforementioned search method, a road that has been travelled by any one of the plurality of users or has been selected as a route by any one of the plurality of users may be specified as the predetermined road. More specifically, in the $f_3$ term of Equation (1), "the number of times someone in the group of multiple users has travelled" may be used. This enables to prompt excursion activity to a group of multiple users.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

What is claimed is:

1. A route searching device comprising:
   a controller; and
   a memory storing computer-readable instructions;
   wherein the computer-readable instructions, when executed by the controller, cause the route searching device to perform:
   obtaining map information including a plurality of roads;
   determining a reference position and a destination on the map information;
   determining a restricting condition for a mobile body to travel by departing from the reference position and reaching the destination, the restricting condition including at least one of an upper limit value of time required to reach the destination and an upper limit value of a distance to the destination; and
   searching a route from the reference position to the destination satisfying the restricting condition,
   wherein the searching of the route includes:
   identifying a predetermined road from among the plurality of roads, the predetermined road being a road on which the mobile body has travelled or which has been selected as the route before in the past; and
   searching the route such that a frequency of selecting the predetermined road in the searching of the route is reduced, wherein
   the searching of the route includes searching the route based on an entropy-based evaluation value, and
   the map information includes a plurality of intersections,
   the computer-readable instructions, when executed by the controller of the route searching device, further cause the route searching device to perform storing, for each of the plurality of intersections, a number of visits that accumulated at least one of a number of times the mobile body travelled through the intersection and a number of times the intersection was selected as the route,
   the searching of the route includes searching the route that reaches the destination via N intersections from the reference position by repeating a process of selecting a K+1th intersection with a Kth intersection as a reference over N times,
   wherein the N is a natural number greater than or equal to 1 and the K is a natural number greater than 1 and less than or equal to N−1,
   the searching of the route includes selecting an intersection with a less number of visits upon selecting the K+1th intersection, and
   the computer-readable instructions, when executed by the controller, further cause the route searching device to perform:
   displaying the searched route on a display configured to receive a user input;
   receiving a user selection via the display of the searched route; and
   guiding the mobile body along the searched route.

2. The route searching device according to claim 1, wherein
   the searching of the route includes selecting the K+1th intersection by heuristic search.

3. The route searching device according to claim 1, wherein
   the computer-readable instructions, when executed by the controller of the route searching device, further cause the route searching device to perform obtaining current location information of the mobile body, wherein
the determining of the reference position and the destination includes determining a present reference position based on the current location information,
the determining of the restricting condition includes determining remaining time as the restricting condition,
the remaining time being obtained by subtracting elapsed time since the mobile body started to travel toward the destination from the upper limit value of the required time, and
the searching of the route includes searching the route again such that the destination can be reached within the remaining time.

4. The route searching device according to claim 1, wherein
the computer-readable instructions, when executed by the controller of the route searching device, further cause the route searching device to perform obtaining current location information of the mobile body,
wherein
the determining of the reference position and the destination includes determining a present reference position based on the current location information,
the determining of the restricting condition includes determining remaining number of waypoints as the restricting condition,
the remaining number of waypoints being obtained by subtracting number of intersections or roads which the mobile body has travelled through since the mobile body started to travel toward the destination from an upper limit value of routable intersections or roads, and
the searching of the route includes searching the route again such that the destination can be reached within the remaining number of waypoints.

5. The route searching device according to claim 1, wherein
the mobile body may comprise a plurality of mobile bodies, and
the searching of the route includes identifying a road on which one of the plurality of mobile bodies has travelled or which has been selected as the route by one of the plurality of mobile bodies as the predetermined road.

6. A non-transitory computer-readable recording medium storing computer-readable instructions for a route searching device that comprises a memory,
the computer-readable instructions, when executed by a controller of the route searching device, causing the route searching device to perform:
obtaining map information including a plurality of roads;
determining a reference position and a destination on the map information;
determining a restricting condition for a mobile body to travel by departing from the reference position and reaching the destination, the restricting condition including at least one of an upper limit value of time required to reach the destination and an upper limit value of a distance to the destination; and
searching a route from the reference position to the destination satisfying the restricting condition,
wherein the searching of the route includes:
identifying a predetermined road from among the plurality of roads, the predetermined road being a road on which the mobile body has travelled or which has been selected as the route before in the past; and
searching the route such that a frequency of selecting the predetermined road in the searching of the route is reduced, wherein
the map information includes a plurality of intersections,
the computer-readable instructions, when executed by the controller of the route searching device, further cause the route searching device to perform storing, for each of the plurality of intersections, a number of visits that accumulated at least one of a number of times the mobile body travelled through the intersection and a number of times the intersection was selected as the route,
the searching of the route includes searching the route that reaches the destination via N intersections from the reference position by repeating a process of selecting a K+1th intersection with a Kth intersection as a reference over N times,
wherein the N is a natural number greater than or equal to 1 and the K is a natural number greater than 1 and less than or equal to N−1,
the searching of the route includes selecting an intersection with a less number of visits upon selecting the K+1th intersection, and
the computer-readable instructions, when executed by the controller of the route searching device, further cause the route searching device to perform:
presenting the searched route on a display configured to receive a user input;
receiving a user selection via the display of the searched route; and
guiding the mobile body along the searched route.

7. The non-transitory computer-readable recording medium according to claim 6, wherein
the searching of the route includes selecting the K+1th intersection by heuristic search.

8. The non-transitory computer-readable recording medium according to claim 6, wherein
the computer-readable instructions, when executed by the controller of the route searching device, further cause the route searching device to perform obtaining current location information of the mobile body,
wherein
the determining of the reference position and the destination includes determining a present reference position based on the current location information,
the determining of the restricting condition includes determining remaining time as the restricting condition,
the remaining time being obtained by subtracting elapsed time since the mobile body started to travel toward the destination from the upper limit value of the required time, and
the searching of the route includes searching the route again such that the destination can be reached within the remaining time.

9. The non-transitory computer-readable recording medium according to claim 6, wherein
the computer-readable instructions, when executed by the controller of the route searching device, further cause the route searching device to perform obtaining current location information of the mobile body,
wherein
the determining of the reference position and the destination includes determining a present reference position based on the current location information,
the determining of the restricting condition includes determining remaining number of waypoints as the restricting condition, the remaining number of waypoints being obtained by subtracting number of intersections or roads which the mobile body has travelled through since the mobile body started to travel toward the destination from an upper limit value of routable intersections or roads, and the searching of the route includes searching the route again such that the destination can be reached within the remaining number of waypoints.

10. The non-transitory computer-readable recording medium according to claim 6, wherein the mobile body may comprise a plurality of mobile bodies, and the searching of the route includes identifying a road on which one of the plurality of mobile bodies has travelled or which has been selected as the route by one of the plurality of mobile bodies as the predetermined road.

11. A route searching device comprising:

a controller; and a memory storing computer-readable instructions;

wherein the computer-readable instructions, when executed by the controller, cause the route searching device to perform:

obtaining map information including a plurality of roads;

determining a reference position and a destination on the map information;

determining a restricting condition for a mobile body to travel by departing from the reference position and reaching the destination, the restricting condition including at least one of an upper limit value of time required to reach the destination and an upper limit value of a distance to the destination; and searching a route from the reference position to the destination satisfying the restricting condition, wherein the searching of the route includes:

identifying a predetermined road from among the plurality of roads, the predetermined road being a road on which the mobile body has travelled or which has been selected as the route before in the past; and searching the route such that a frequency of selecting the predetermined road in the searching of the route is reduced, wherein the computer-readable instructions, when executed by the controller of the route searching device, further cause the route searching device to perform obtaining current location information of the mobile body, wherein the determining of the reference position and the destination includes determining a present reference position based on the current location information, the determining of the restricting condition includes determining remaining time as the restricting condition, the remaining time being obtained by subtracting elapsed time since the mobile body started to travel toward the destination from the upper limit value of the required time, the searching of the route includes searching the route again such that the destination can be reached within the remaining time, and the computer-readable instructions, when executed by the controller, further cause the route searching device to perform:

displaying the route searched again on a display configured to receive a user input;

receiving a user selection via the display of the route searched; and guiding the mobile body along the route searched again.

12. A route searching device comprising:

a controller; and a memory storing computer-readable instructions;

wherein the computer-readable instructions, when executed by the controller, cause the route searching device to perform:

obtaining map information including a plurality of roads;

determining a reference position and a destination on the map information;

determining a restricting condition for a mobile body to travel by departing from the reference position and reaching the destination, the restricting condition including at least one of an upper limit value of time required to reach the destination and an upper limit value of a distance to the destination; and searching a route from the reference position to the destination satisfying the restricting condition, wherein the searching of the route includes:

identifying a predetermined road from among the plurality of roads, the predetermined road being a road on which the mobile body has travelled or which has been selected as the route before in the past; and searching the route such that a frequency of selecting the predetermined road in the searching of the route is reduced, wherein the computer-readable instructions, when executed by the controller of the route searching device, further cause the route searching device to perform obtaining current location information of the mobile body, wherein the determining of the reference position and the destination includes determining a present reference position based on the current location information, the determining of the restricting condition includes determining remaining number of waypoints as the restricting condition, the remaining number of waypoints being obtained by subtracting number of intersections or roads which the mobile body has travelled through since the mobile body started to travel toward the destination from an upper limit value of routable intersections or roads, the searching of the route includes searching the route again such that the destination can be reached within the remaining number of waypoints, and the computer-readable instructions, when executed by the controller, further cause the route searching device to perform:

displaying the route searched again on a display configured to receive a user input;

receiving a user selection via the display of the route searched again; and guiding the mobile body along the selected route searched again.

13. A non-transitory computer-readable recording medium storing computer-readable instructions for a route searching device that comprises a memory, the computer-readable instructions, when executed by a controller of the route searching device, causing the route searching device to perform:

obtaining map information including a plurality of roads;

determining a reference position and a destination on the map information;

determining a restricting condition for a mobile body to travel by departing from the reference position and reaching the destination, the restricting condition including at least one of an upper limit value of time required to reach the destination and an upper limit value of a distance to the destination; and searching a route from the reference position to the destination satisfying the restricting condition, wherein the searching of the route includes:
- identifying a predetermined road from among the plurality of roads, the predetermined road being a road on which the mobile body has travelled or which has been selected as the route before in the past; and
- searching the route such that a frequency of selecting the predetermined road in the searching of the route is reduced, wherein the computer-readable instructions, when executed by the controller of the route searching device, further cause the route searching device to perform obtaining current location information of the mobile body, wherein the determining of the reference position and the destination includes determining a present reference position based on the current location information, the determining of the restricting condition includes determining remaining time as the restricting condition,
- the remaining time being obtained by subtracting elapsed time since the mobile body started to travel toward the destination from the upper limit value of the required time, the searching of the route includes searching the route again such that the destination can be reached within the remaining time, and the computer-readable instructions, when executed by the controller of the route searching device, further cause the route searching device to perform:
- displaying the route searched again on a display configured to receive a user input;
- receiving a user selection via the display of the route searched again; and
- guiding the mobile body along the route searched again.

14. A non-transitory computer-readable recording medium storing computer-readable instructions for a route searching device that comprises a memory, the computer-readable instructions, when executed by a controller of the route searching device, causing the route searching device to perform:

obtaining map information including a plurality of roads;

determining a reference position and a destination on the map information;

determining a restricting condition for a mobile body to travel by departing from the reference position and reaching the destination, the restricting condition including at least one of an upper limit value of time required to reach the destination and an upper limit value of a distance to the destination; and searching a route from the reference position to the destination satisfying the restricting condition, wherein the searching of the route includes:
- identifying a predetermined road from among the plurality of roads, the predetermined road being a road on which the mobile body has travelled or which has been selected as the route before in the past; and
- searching the route such that a frequency of selecting the predetermined road in the searching of the route is reduced, wherein the computer-readable instructions, when executed by the controller of the route searching device, further cause the route searching device to perform obtaining current location information of the mobile body, wherein the determining of the reference position and the destination includes determining a present reference position based on the current location information, the determining of the restricting condition includes determining remaining number of waypoints as the restricting condition,
- the remaining number of waypoints being obtained by subtracting number of intersections or roads which the mobile body has travelled through since the mobile body started to travel toward the destination from an upper limit value of routable intersections or roads, the searching of the route includes searching the route again such that the destination can be reached within the remaining number of waypoints, and the computer-readable instructions, when executed by the controller of the route searching device, further cause the route searching device to perform:
- displaying the route searched again on a display configured to receive a user input;
- receiving a user selection via the display of the route searched again; and
- guiding the mobile body along the route searched again.

* * * * *